(12) United States Patent
Betzl et al.

(10) Patent No.: US 7,264,307 B2
(45) Date of Patent: Sep. 4, 2007

(54) MOTOR VEHICLE COMPONENT WITH A GUIDE RAIL STRUCTURE

(75) Inventors: Thomas Betzl, Andechs (DE); Walter Schaetzler, Starnberg (DE)

(73) Assignee: Open Air Systems GmbH, Stockdorf (DE)

( * ) Notice: Subject to any disclaimer, the term of this patent is extended or adjusted under 35 U.S.C. 154(b) by 0 days.

(21) Appl. No.: 11/099,703

(22) Filed: Apr. 6, 2005

(65) Prior Publication Data

US 2005/0225125 A1   Oct. 13, 2005

(30) Foreign Application Priority Data

Apr. 7, 2004   (DE)   ............ 10 2004 017 569

(51) Int. Cl.
*B60J 7/06* (2006.01)
(52) U.S. Cl. ................... 296/216.08; 296/219
(58) Field of Classification Search .......... 296/216.08, 296/219
See application file for complete search history.

(56) References Cited

U.S. PATENT DOCUMENTS

| | | | | |
|---|---|---|---|---|
| 4,941,706 A | * | 7/1990 | Jardin | 296/213 |
| 4,968,090 A | * | 11/1990 | Schleicher et al. | 296/223 |
| RE34,098 E | * | 10/1992 | Schleicher et al. | 296/216.08 |
| 6,454,346 B1 | * | 9/2002 | Nabuurs | 296/216.06 |
| 6,460,920 B1 | | 10/2002 | Reinsch | |

\* cited by examiner

*Primary Examiner*—Dennis H. Pedder
(74) *Attorney, Agent, or Firm*—David S. Safran

(57) ABSTRACT

A motor vehicle component with a guide rail structure (15) which is located at least partially on a sectional part (20) which forms the bearing structure of the vehicle component. To simplify the guide rail structure (15) and make it cheaper, it is provided that the sectional part (20) forms only one part (22) of the guide rail structure (15) and the other part (32) of the guide rail structure (15) is formed by a second sectional part (30) which can be connected to the first sectional part (20). The divided execution makes it possible to form, much more easily, the guideways (24, 25, 26; 33, 34) and cable channels (91) which must otherwise be produced in a complex manner as undercut sectional parts.

15 Claims, 3 Drawing Sheets

MOTOR VEHICLE COMPONENT WITH A GUIDE RAIL STRUCTURE

BACKGROUND OF THE INVENTION

1. Field of Invention

The invention relates to a motor vehicle component with a guide rail structure which is located at least partially on a sectional part which forms the bearing structure of the vehicle component.

2. Description of Related Art

German Patent Application DE 199 39 725 A1 and corresponding U.S. Pat. No. 6,460,920 disclose a motor vehicle component formed by a side roof member in which guide rails for an openable roof part are formed directly on an extruded section which forms the bearing structure of the roof member. An outer skin-lining section of plastic is attached thereto by cementing. The extruded section has several cavities and undercuts and is therefore very complex and expensive to produce.

SUMMARY OF THE INVENTION

A primary object of the present invention is to devise amotor vehicle component of the initially named type in which a guide rail structure can be easily produced.

This object is achieved in the initially mentioned vehicle component by the sectional part forming only one part of the guide rail structure and the other part of the guide rail structure being formed by another, second sectional part which can be connected to the first sectional part.

Because the guide rail structure is formed by two sectional parts which can be connected to one another, the guideways and cable guide channels which are otherwise made as undercuts can be made as simple moldings in the sectional parts.

According to a preferred embodiment, the first sectional part is made of plastic. On the one hand, this contributes to saving of weight, and on the other, a material with good sliding properties can be used as the plastic.

According to another preferred embodiment, the second sectional part is also made of plastic. The advantages here are the same.

Alternatively, the first sectional part and/or the second sectional part can also be formed from a metal section. In particular, lightweight metal sections, such as, for example, aluminum sections, are suited for this purpose. The guideways and the cable guide channels, in this case, can be coated with a slippery lacquer or a plastic layer with good sliding properties.

Preferably, the first sectional part forms the lower part of the guide rail structure and the second sectional part forms the top part of the guide rail structure. Both sectional parts, in this case, are preferably provided with a horizontal flange on which they are connected to one another. The connection takes place preferably by means of screws or rivets.

The first sectional part and the second sectional part, preferably, each have another flange on which they are connected to the lining part. The connection takes place, preferably, by adhesive surfaces. Alternatively, at least one of the connections can also be made by positive engagement of two complementary connecting elements.

The first sectional part and the second sectional part, preferably, jointly border a cable channel for guidance of a driving cable. Thus, this cable channel can likewise be made as an open section on one of the sectional parts which is added to a partially closed section after connection to the other sectional part.

The first sectional part and/or the second sectional part, preferably, have projections and/or receivers for attachment of adjacent seals or inside lining parts.

One especially preferred application for a motor vehicle component in accordance with the invention is that it is formed by a side roof member of an openable motor vehicle roof, as is the case in the initially described prior art, as per German Patent Application DE 199 39 725 A1 and corresponding U.S. Pat. No. 6,460,920. The openable motor vehicle roof is, preferably, made as a convertible with a folding top covering or as a convertible formed of rigid roof parts. However, also other applications are possible in which a supporting vehicle part is provided with a guide rail structure. The frame of a sliding roof is one example of this.

According to one especially advantageous embodiment, the first sectional part with the second sectional part and a lining part which is connected to these two sectional parts together forms a closed hollow section with a hollow chamber. In this way, the geometrical moment of inertia of the finished motor vehicle component, which is of primary importance for the bending, buckling and torsional stiffness, is greatly increased. In the initially described prior art of German Patent Application DE 199 39 725 A1 and corresponding U.S. Pat. No. 6,460,920, these hollow chambers are integrated directly into the extruded section which forms the support structure, by which its complexity is increased.

The motor vehicle component of the present invention is explained in detail below with reference to the accompanying drawings.

DETAILED DESCRIPTION OF THE INVENTION

Figure 1:
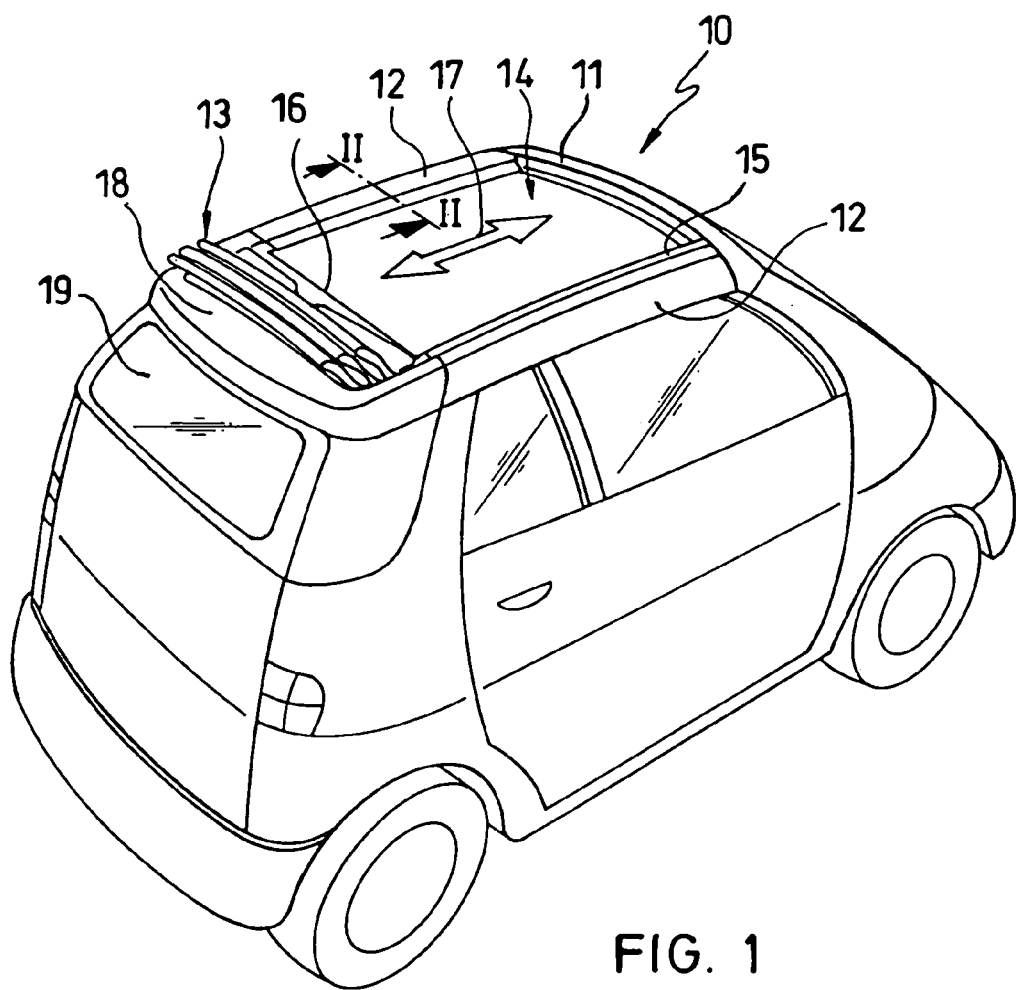
FIG. 1 is a perspective view of a motor vehicle with a roof having an openable roof part and side roof members which form the motor vehicle component.

FIG. 1 shows a motor vehicle roof 10 in which the front end of two roof lateral members 12 are attached to a front roof apron 11 and are attached to a roof cassette 18 at their back end. The apron 11, the roof members 12 and the roof cassette 18 border a roof opening 14 which can be selectively closed or at least partially cleared by means of an openable roof part 13. In the illustrated embodiment, the openable roof part 13 is made as a folding roof with a front guide bow 16 which is movably guided on a guide rail structure 15 which is located on the roof members 12. The openable roof part 13, which preferably is movable by means of an electric drive (not shown) in the direction of the arrow 17, is completely opened in FIG. 1. In this state, it is completely retracted into the roof cassette 18, and together with the cassette 18 and the rear window 19 which follows to the rear, can be stowed in a stowage space in the rear area of the vehicle, as is known. The roof members 12 can be swung onto the roof cassette 18 after the lock on the apron 11 is detached and jointly with the rear window 19, and optionally, also with the C pillars can be lowered into the stowage space. Alternatively, manual removal of the side roof members 12 is also possible.

Figure 2:
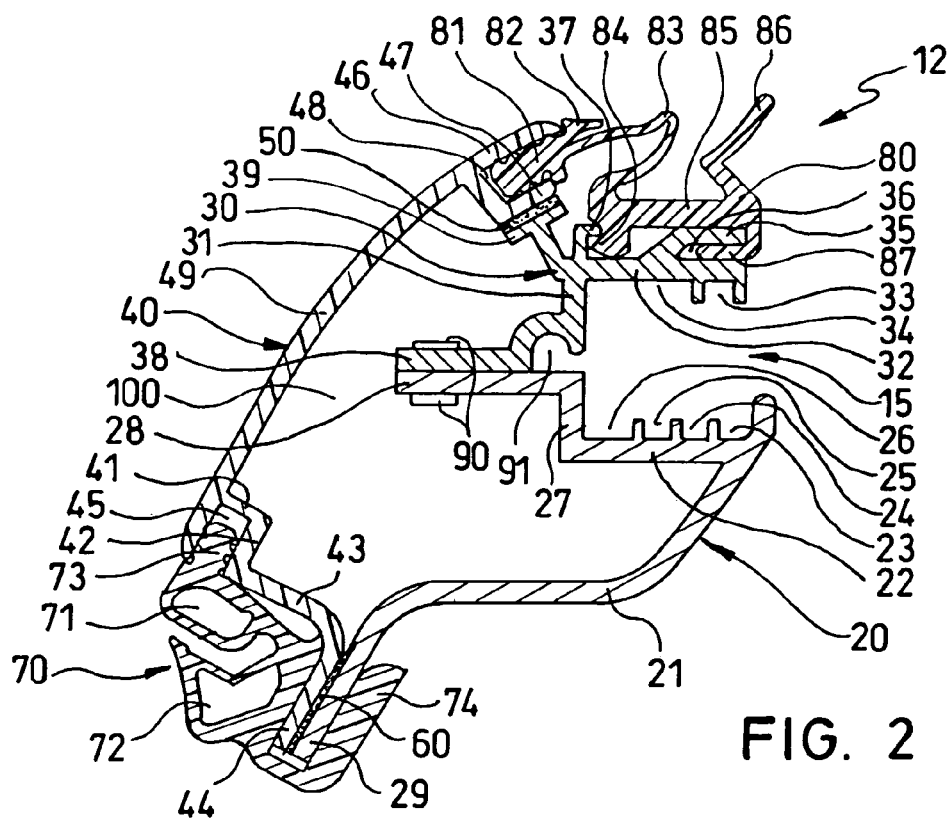
FIG. 2 shows a cross section through the left side roof member taken along line II-II in FIG. 1.

FIG. 2 shows a cross section through the left side roof member 12 which, in all embodiments, represents the "roof part" of the invention. The roof member 12 is composed of a first sectional part 20, a second sectional part 30 and a lining part 40 which forms the outer side and which is connected to both. In all embodiments, the guide rail structure 15 is formed jointly by the first sectional part 20 and the second sectional part 30.

The first sectional part 20 forms the lower part of the inner side of the side roof member 12. It is composed of a bearing section 21 which is Z-shaped, and from near the top edge of which a horizontal bridge projects outward relative to the vehicle centerline (into the interior of the roof member 12). The top of the bridge forms the lower part 22 of the guide rail structure 15 with the guideways 23, 24, 25, 26 being made in the structure and separated from one another by vertical ridges. These guideways are adjoined by a short vertical wall 27 from which a horizontal flange 28 projects outward relative to the vehicle centerline. The horizontal flange 28 is molded onto the top edge of the vertical wall 27. The lower part 22 of the guide rail structure 15 with the vertical wall 27 and the horizontal flange 28 forms a rectangular step so that the bottoms of the guideways 23, 24, 25, 26 are arranged parallel to the flange 28. Near the lower edge of the first sectional part 20, on its bearing section 21, there is a surface which descends obliquely outward as a lower flange 29.

The second sectional part 30 has a horizontal flange 38 that is parallel to the flange 28 of the first sectional part 20. It is adjoined to the inside by an arc-shaped section with a cable channel 91 molded onto its inside as part of the annular cross section. The channel is adjoined to the top by a vertical wall 31. From the vertical wall 31, a top part 32 of the guide rail structure 15, as a horizontal bridge, projects to the inside; guideways 33, 34 are formed on its bottom separated by a vertical ridge. The top part 32, in turn, lies parallel to the flange 38 so that the bottoms of the guideways 33, 34 are located exactly parallel to the bottoms of the guideways 23, 24, 25, 26 on the bottom part 22 of the guide rail structure 15. The guideways 23, 24, 25, 26 and 33, 34 are used to guide sliding elements or actuating elements (not shown) and which are necessary for movable support and for actuation of the openable roof part 13. The required driving forces are directed into the pertinent sliding elements by a driving cable (not shown) and which is guided in the cable channel 91 by a connecting element (not shown) and which penetrates a slot which is formed on the inside between the flanges 28, 38.

Above the top part 32 of the guide rail structure 15 spaced apart from the latter is a horizontal bridge 35 which projects to the inside on the second sectional part 30 and which, together with the top part 32, borders a horizontal slot which is open to the inside as a receiver 36 for attachment of a seal 80 which is described below. The vertical wall 31 above the upper part 32 at the height of the horizontal bridge 35 is adjoined by a short horizontal bridge 37 which projects in a hook shape to the inside and which likewise is used to attach part of the seal 80. Furthermore, another bridge which is adjoined by an upper flange 39 at a right angle to it branches off the vertical wall 31 obliquely upward and toward the outer side.

The upper flange 39 of the second sectional part 30 and the lower flange 29 of the first sectional part 20 are used to attach the lining part 40 which covers the side roof member 12 to the outside and which is preferably made as a plastic molding which is enameled or dyed completely in the vehicle color. The lining part 40 has an outside skin 49 in the form of a plate which is curved according to the vehicle contour. Near the lower edge of part 40, there is a bridge 41 which projects at a right angle to the inside and which is adjoined by a bridge 42 which projects downward parallel to the outside skin 49. The lower end of the outside skin 49 and the bridge 42 border a receiver 45 for attachment of a seal 70 which is described below. The bridge 42 is adjoined by another bridge 43 which is located parallel to the bridge 41 and which passes in an arc shape down into a lower flange 44 which, after joining the sectional parts 20, 30 to the lining part 40, is located parallel to the lower flange 29. Near the top edge of the outside skin 49, another bridge projects from it roughly at a right angle to the inside and is adjoined by a short bridge 47 at a right angle and directed obliquely upward. The bridge 47 together with the top end 46 of the outside skin 49 forms a receiver 48 for attachment of another part of the seal 80.

The first sectional part 20 and the second sectional part 30 are joined on their flanges 28, 38 and by means of a connection 90, which can be made preferably as a screw connection, as a riveted connection or also as a cemented connection, are securely connected to one another. In doing so, the lower part 22 and the upper part 32 of the guide rail structure 15 are combined into a whole, the guideways 23, 24, 25, 26, and 33, 34 being positioned exactly relative to one another. At the same time, the part of the flange 28 projecting to the inside is added to the hollow section of the guide channel 91, which section is open to there to the bottom. Then, the lining part 40 is joined to the unit comprised of the first sectional part 20 and the second sectional part 30. This takes place in the embodiment, as shown in FIG. 2, by a cement 50 which is applied between the top flange 39 of the second sectional part 30 and the bridge 47 of the lining part 40 as a flat adhesive layer. In the lower area, the lining part 40 is connected via the lower flange 44 by means of a cement 60 which has been applied as a flat adhesive layer to the lower flange 29 of the first sectional part 20. After curing of the cement 50, 60, the first sectional part 20, the second sectional part 30 and the lining part 40 jointly form a hollow section which includes a cavity 100. This hollow section has a large geometrical moment of inertia and is thus very stable against bending, torsion, and buckling.

For sealing the side roof member 12 in its lower area there is a seal 70. The seal 70 is inserted with a seal foot 73 into the receiver 45 on the lining part 40. On its inner bottom side, with one leg 74 it extends around the lower flange 44 of the lining part 40 and the lower flange 29 of the first sectional part 20, which lower flange is connected to it. The seal 70 has a lower hollow chamber 72 and an upper hollow chamber 71, next to which the vehicle door or the vehicle window, on the one hand, is placed from underneath, on the other hand, laterally forming a seal.

For sealing the side roof member 12 opposite the openable roof part 13, there is a seal 80 in its upper area. The seal 80 is inserted with the seal foot 81 into the receiver 48 on the lining part 40. It is anchored with another foot 84 under the bridge 37 of the second sectional part 30. In addition, one leg 87 of the seal 80 extends around the horizontal bridge 35 on the second sectional part 30 and is attached with the leg 87 in the receiver 36. The seal 80, with a projection 82 which is matched to the contour of the lining part 40, extends over its top end 46. Between the seal foot 81 and the foot 84, an upper seal wall 83 extends, and after installation, in conjunction with the upper flange 39 of the second sectional part 30 and the bridge 47 on the lining part 40, forms a type of hollow chamber. Between the foot 84 and the leg 87, the seal 80 is made in the form of a horizontal bridge 85 with a top which forms a gutter in conjunction with a descending flank of the upper seal wall 83 and the opposing ascending flank of a sealing lip 86 which extends up on the inner side. The openable roof part 13, in the closed state, is placed from overhead next to the free end of the sealing lip 86 and the upper seal wall 83, forming a seal, and presses them somewhat downward. The shape of the seal 80, in this embodiment, is matched to the openable roof part 13 which is made as a folding roof. It can also assume a different shape when the openable roof part is made as a fixed roof part, for example, in the form of a movable cover.

Figure 3:
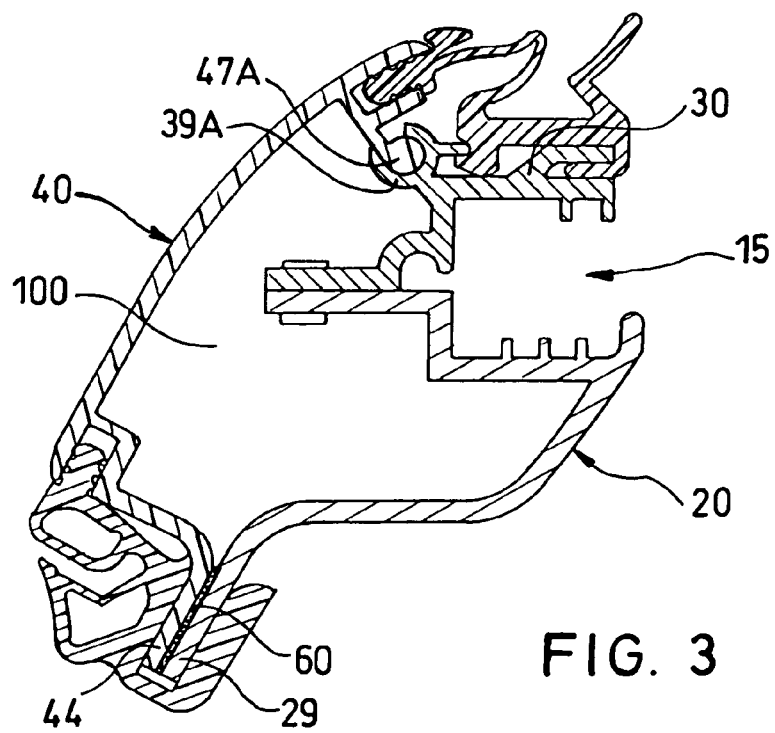
FIG. 3 is a view corresponding to that of FIG. 2, but shows a second embodiment of the roof member.

In FIG. 2, the second sectional part 30 is made as an aluminum sectional part and is joined to the lining part 40 by means of a cement 50. In FIG. 3, the second sectional part 30, which is likewise made as an aluminum sectional part, instead of the upper flange 39, has a connecting element 39A which is made in the form of an annular cross section which is partially opened to the top. The lining part 40, in this case, instead of the bridge 47, has a connecting element 47A which has an essentially circular cross section which positively engages the connecting element 39A in a complementary manner. The connection of the lining part 40 on the unit formed of the first sectional part 20 and the second sectional part 30 takes place, in this case, such that first the connecting element 47A is inserted into the connecting element 39A in the lengthwise direction, and then the lower flange 44 is connected to the lower flange 29 by the cement 60.

Figure 4:
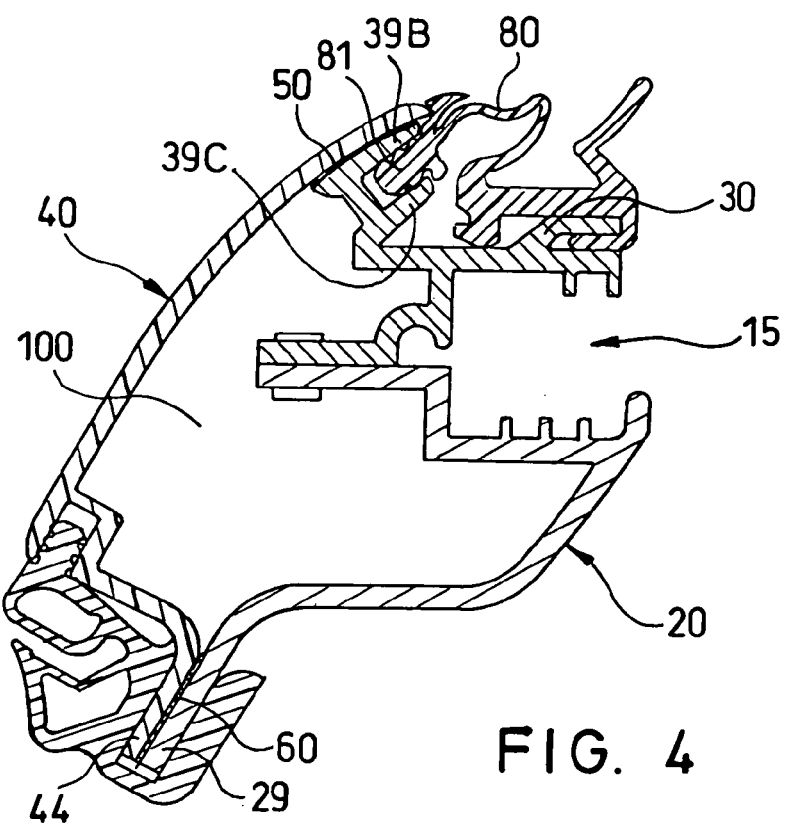
FIG. 4 is a view corresponding to that of FIG. 2, but shows a third embodiment of the roof member.

The embodiment as shown in FIG. 4 differs from the preceding one in that the second sectional part 30 is made as a plastic section. The second sectional part 30, in the upper left area, has two bridges 39C, 39B which are spaced apart from one another and which, in this case, form a receiver for the seal foot 81 of the upper seal 80. The outer side of the bridge 39B, moreover, forms a flange on which the lining part 40 is connected to its inner side via a cement 50 which has been applied in the form of an adhesive surface. The connection of the bottom of the lining part 40 with the first sectional part 20 takes place as in the preceding embodiments via the lower flange 44, the cement 60 and the lower flange 29 on the first sectional part 20.

Figure 5:
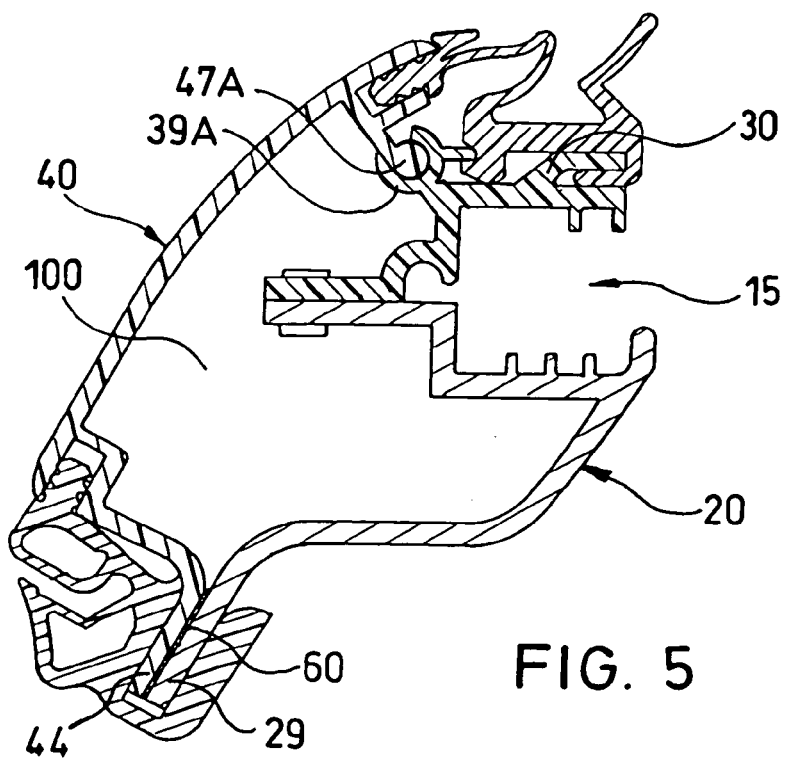
FIG. 5 is a view corresponding to that of FIG. 2, but shows a fourth embodiment of the roof member.

In the embodiment as shown in FIG. 5, the second sectional part 30 is likewise made in the form of a plastic section. The connection to the lining part 40 takes place analogously to FIG. 3 via connecting elements 39A and 47A which positively engage one another. The connection of the bottom of the lining part 40 to the first sectional part 20 takes place, as in the preceding embodiments, via the lower flange 44, the cement 60 and the lower flange 29 on the first sectional part 20.

What is claimed is:

1. Motor vehicle roof side member, comprising:
a guide rail structure which is located at least partially on a first sectional part which forms a lower inner bearing part of the vehicle roof side member, wherein the first sectional part forms only one part of the guide rail structure and another part of the guide rail structure is formed by a second sectional part which is connected to the first sectional part; and wherein the first sectional part, the second sectional part, and a lining part which is comprises an outside skin of the roof side member and is connected to the first and second sectional parts each of which forms with the lining part a portion of the periphery of a closed hollow section with a hollow chamber.

2. Motor vehicle component as claimed in claim 1, wherein the first sectional part is made of plastic.

3. Motor vehicle component as claimed in claim 2, wherein the second sectional part is made of plastic.

4. Motor vehicle component as claimed in claim 2, wherein the second sectional part is formed from a metal section.

5. Motor vehicle component as claimed in claim 1, wherein the first sectional part forms a lower part of the guide rail structure and the second sectional part forms a top part of the guide rail structure.

6. Motor vehicle component as claimed in claim 1, wherein the first sectional part and the second sectional part each have a horizontally arranged flange on which they are connected to one another via a connection.

7. Motor vehicle component as claimed in claim 6, wherein the connection is formed by screws or rivets.

8. Motor vehicle component as claimed in claim 6, wherein the first sectional part has a second flange for connection to the lining part.

9. Motor vehicle component as claimed in claim 8, wherein in the area of the second flange a cement connection is formed.

10. Motor vehicle component as claimed in claim 8, wherein the second sectional part has a second flange for connection to the lining part.

11. Motor vehicle component as claimed in claim 10, wherein in the area of the second flanges a cement connection is formed.

12. Motor vehicle component as claimed in claim 1, wherein the first sectional part and the second sectional part jointly border a cable channel for guidance of a driving cable.

13. Motor vehicle component as claimed in claim 1, wherein at least one of the first sectional part and the second sectional part have at least one of projections and receivers for attachment of seals or inside lining parts.

14. Motor vehicle component as claimed in claim 1, wherein the motor vehicle component is a side roof member of an openable motor vehicle roof.

15. Motor vehicle component as claimed in claim 14, wherein the roof member forms part of a convertible roof.

* * * * *